Figure 1:
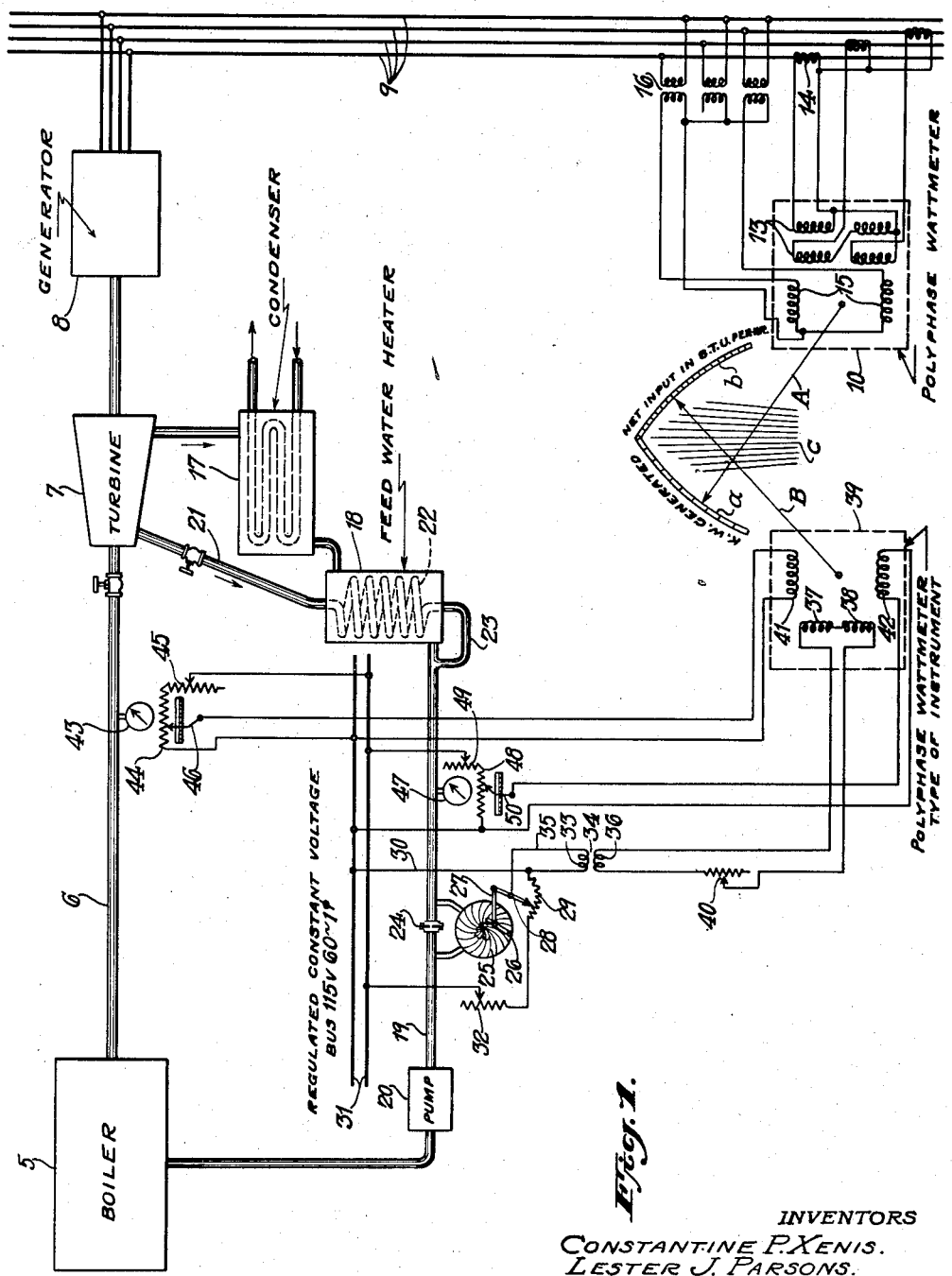

INVENTORS
CONSTANTINE P. XENIS.
LESTER J. PARSONS.
WOODMAN PERINE.
ROBERT E. KING.
BY  HAROLD A. BAUMAN.
Ward, Crosby + Neal
ATTORNEYS INVENTORS
CONSTANTINE P. XENIS.
LESTER J. PARSONS.
WOODMAN PERINE.
ROBERT E. KING.
HAROLD A. BAUMAN.
BY Ward, Crosby & Neal
ATTORNEYS

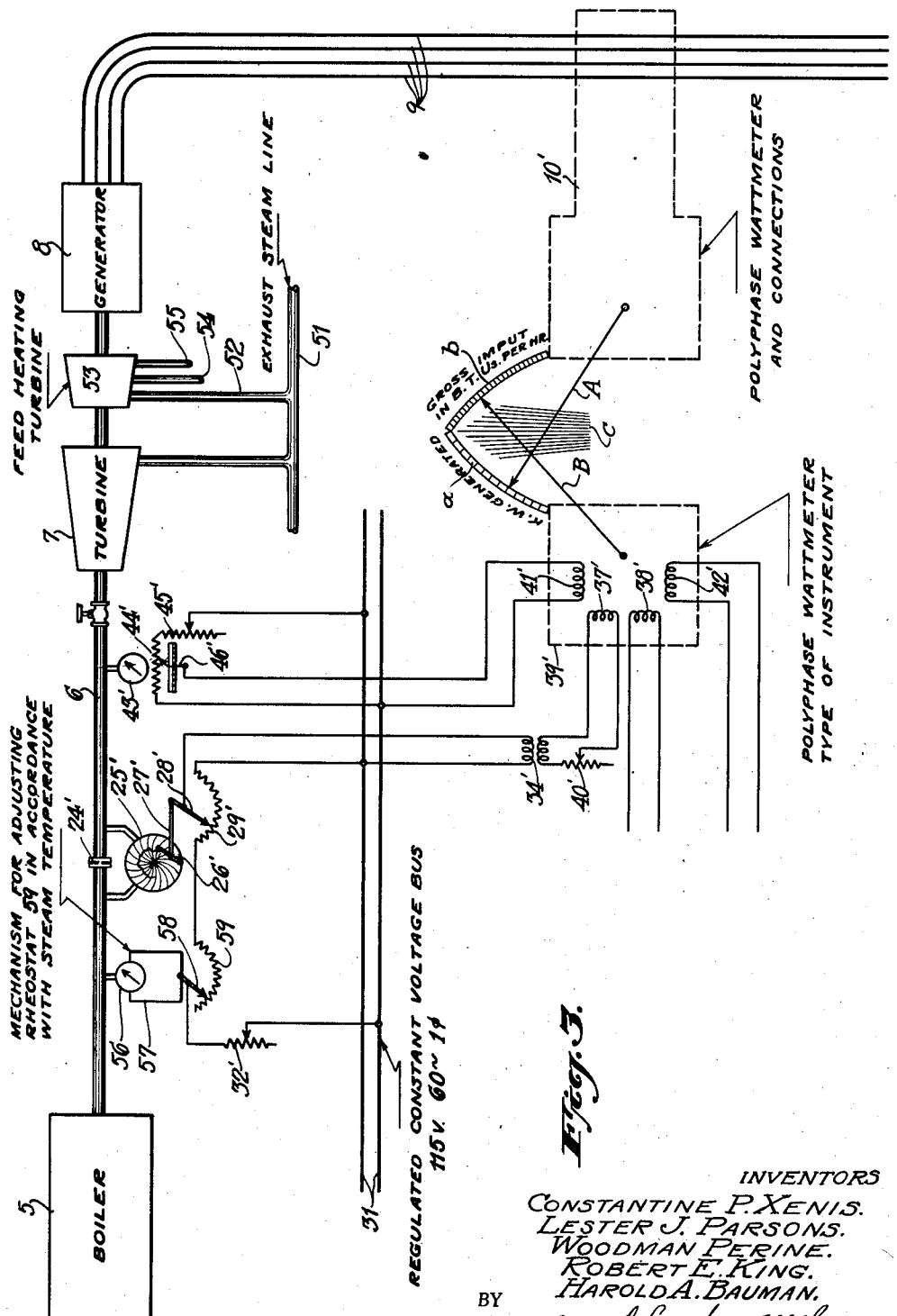

Patented Sept. 12, 1944

2,357,921

UNITED STATES PATENT OFFICE 2,357,921

METHOD AND APPARATUS FOR INDICATING EFFICIENCY OF TURBOGENERATORS AND OTHER POWER PLANT EQUIPMENT

Constantine P. Xenis, Little Neck, Lester J. Parsons, Queens Village, Woodman Perine, Halesite, Robert E. King, Brooklyn, and Harold A. Bauman, Forest Hills, N. Y., assignors to Consolidated Edison Company of New York, Inc., New York, N. Y., a corporation of New York Application May 10, 1941, Serial No. 392,908

6 Claims. (Cl. 73—51)

This invention relates to methods and apparatus for indicating or measuring the efficiency of power generating equipment. The invention will be particularly described in connection with methods and apparatus for indicating the efficiency of steam-driven turbo-generator units and associated equipment, but it will be understood that the invention or certain of its features are also adaptable for use with various other forms of energy transforming equipment, including hydro-electric generating units.

The invention also includes methods and means for accurately measuring or indicating the rates of supply of energy in fluid mediums as supplied to or from energy transforming equipment, as for example, for measuring the varying amount of heat supplied in a steam line for any purpose.

Heretofore in order to measure the efficiency of steam-driven electric power generating units or the like, it has been necessary to resort to the method of carefully weighing the condensates from the heat engine at frequent intervals while concurrently making careful temperature and pressure measurements of the steam supply and temperature measurements of the condensate, as well as concurrently measuring independently, the electric power output. Then upon resorting to steam tables and computations, the efficiency of the generating unit for the particular period of the test may be approximately calculated. This method is not only very expensive, and time-consuming, but requires the services of experts and interferes with normal operations in the power plant. Also it does not provide indications for promptly showing the effect on the efficiency, of numerous changes and adjustments which may be made in the operating conditions. On the other hand, according to the present invention, measurements of factors affecting the efficiency may constantly be made and correlated automatically so as to immediately indicate the efficiency, and the extent to which the efficiency varies because of any changes which may be made from moment to moment, or over longer periods, in the operating conditions of the power plant.

It is believed that the invention provides for the first time, complete and practical means by which accurate "heat rate" or efficiency indications may be immediately given, to permit a power plant operator to adjust and control for highest efficiency, the numerous operating conditions of the plant, and to try different combinations of conditions, and immediately note the effect of the changes on the efficiency. For example, instantaneous heat rate indications may be given for various loads and under varying operating conditions such as varying degrees of vacuum, varying amounts of "bleed" of steam from the turbines to feed water heaters, and with varying circulating water temperatures. Such data may be used in the economical distribution of the load between various generating units of a central station. The heat rate indications as given from time to time will reveal any trend toward decreased efficiency and thus serve as a basis for maintenance and repair schedules. The invention is also adapted for integrating the heat rates, if desired, of several generating units, thus making available over-all station efficiency data. The invention thus affords means to enable operation of the plant at highest efficiency with consequent large savings in fuel, while eliminating the great expense of efficiency tests of the type heretofore necessary. The use of the invention will focus attention of operating personnel on practices conducive to maximum operating efficiency and enable detailed comparison of the operating results obtained by the various different engineers in charge of the plant at different times. Furthermore, if desired, the measurements or indications may be utilized for automatically controlling various operating conditions of the plant to obtain highest efficiency.

In applying the invention to the problem of indicating the efficiency of a steam-driven turbo-generator, for example, the invention in general contemplates establishing a plurality of electrical analogues representing respectively the various factors which determine the rate of either the input or the net input in heat units to the heat engine. These analogues may be in the form of varying voltages, for example, or varying currents, frequencies or phase differences in electrical circuits. Further, according to the invention, such analogues may by suitable electromagnetic instruments, be added, subtracted or multiplied as necessary to provide a measurement or indication of the rate of energy input or net input, and such measurements or indications may be so correlated with measurements of the electric power output as to constantly compare the input with the output, or indicate the quotient of the input divided by the output, and to thereby indicate the efficiency.

In our copending application entitled "Methods and apparatus for indicating efficiency of boilers or the like," filed on even date herewith, Serial No. 392,909, methods and apparatus are disclosed for applying certain of the principles of this invention to problems such as the automatic indicating and recording of the varying efficiencies of evaporating equipment and the like.

Various further and more specific objects, features and advantages will more clearly appear from the detailed description given below taken in connection with the accompanying drawings which form a part of this specification and illustrate merely by way of example, preferred forms of the invention. The invention consists in such novel features, arrangements and combinations of parts as may be shown and described in connection with the apparatus herein disclosed and also such novel methods as are disclosed and described hereinafter.

Figure 2:
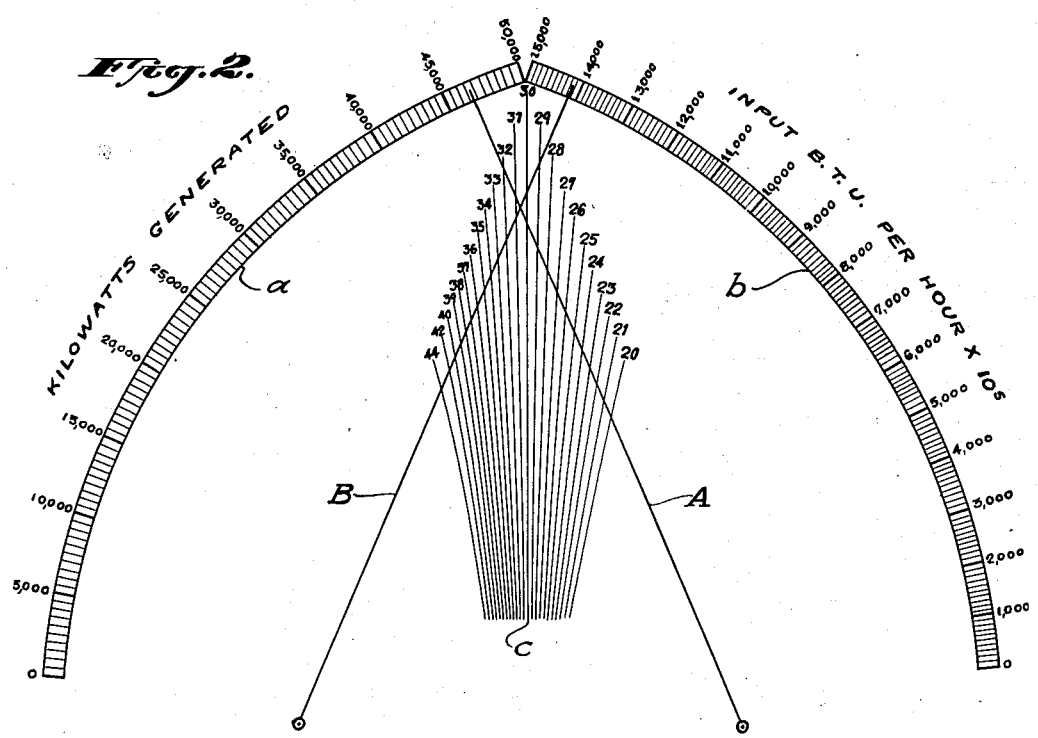

In the drawings, Fig. 1 is a diagram showing an arrangement of the invention as applied to a steam-driven turbo-generator where the turbine is accompanied by a condenser and feed water heater from which the condensate is returned to a boiler;

Fig. 2 is an enlarged view of one of the instrument dials of the arrangement of Fig. 1; and Fig. 3 is a diagram similar to Fig. 1, but showing the invention as applied to a generating unit from which the exhaust steam from the turbines is conducted to an exhaust steam line, and the energy available in the exhaust steam is disregarded in the measurements or indications of "efficiency."

Referring to Fig. 1, a boiler is shown at 5, from which a steam line 6 runs to a turbine 7 for driving an electric generator 8. The generator may be connected as shown, for example, to three-phase busses as at 9. The electric power generated and supplied to the busses may be measured as by a polyphase watt meter 10 having an indicator hand or pointer A for indicating if desired, along a scale a, the kilowatts generated. The watt meter 10 may be of a suitable known type having its current coils as at 13 associated with the power busses by a suitable known arrangement of current transformers as at 14 and having its potential coils as at 15 associated with the power busses as by a suitable known arrangement of potential transformers 16.

The exhaust steam from the turbine as indicated may pass through a condenser 17, from which the condensate may pass through a feed water heater 18, and thence through a feed water pipe 19 and pump 20, back to the boiler. If desired also as shown, steam may be withdrawn at a suitable point from the turbine as through pipe 21 connected to a heating coil 22 in the feed water heater 18, and the condensate from this coil may be conducted by pipe 23 into the feed water return pipe 19.

The apparatus as hereinafter described in connection with Fig. 1 is designed to measure and indicate the over-all efficiency of the equipment comprising the turbine and generator as well as the condenser and feed water heater as associated with the turbine. That is, the arrangement measures or indicates the heat input in B. t. u's. per unit of time supplied to this equipment, also the heat returned in the feed water, and then compares the difference between such measurements with the kilowatts generated.

To measure the heat contained in the steam input to the equipment, it is theoretically necessary to take into consideration three factors, viz: the rate of supply of the steam in units of weight per unit of time, the pressure of such steam and its temperature. With the values for these three factors available, reference could of course be had to steam tables to determine the rate of heat input. Also the heat recovered from the turbine and its accessory condensing devices may be determined by measuring the rate of flow of the condensate and multiplying same by the temperature of the condensate, to obtain a factor which may be subtracted from the heat input to give the net heat input to the turbine and its said associated equipment. Inasmuch as according to the present invention, measurements or indications of the efficiency are to be available immediately and automatically, it will be apparent that means must be provided for correlating the measurements of quantity, temperature and pressure of the steam input without reference to steam tables or any equivalent expedient. It has been found that for practical purposes, within the ranges of the variations in the steam pressure and temperature customarily met with in power plants, that the heat content per unit of weight of the steam supplied, varies substantially in direct proportion to the steam temperature, at least within limits such that the methods and apparatus of the present invention may be operated in practice for most power plants, to give efficiency readings as accurate or even more accurate than with the former laborious methods of weighing the condensate and taking simultaneous temperature and pressure readings. Thus in the practical use of the invention in most power plants it has been found that the only variables which need be measured, to measure the heat input to the turbine, comprise first the rate of supply of the steam in units of weight per unit of time, and second, the temperature of the steam as supplied. Thus, the product of these two factors will give a measure of the rate of heat supplied to the turbine without concurrently measuring the steam pressure. The discovery and appreciation of this fact simplifies the problem of immediate or automatic measurement of the heat content of the steam input, by creating electrical analogues varying respectively according to the rate of steam supply and according to its temperature, and by measuring the product of these analogues.

In the particular arrangement shown in Fig. 1, the condensate of all of the steam entering the turbine is returned to the boiler through pipe 19 and consequently by measuring the flow through this pipe, one may obtain a measure of the rate of supply of the steam in pounds at any time without resorting to any of the delicate instruments required for measuring the flow of steam as such. For obtaining this measurement, an orifice as at 24 may be provided in the pipe 19 and accompanied by a suitable known form of liquid flow meter 25. While this flow meter theoretically will measure the rate of flow of the condensate in terms of units of volume, yet since the flowing medium here is a liquid such volumetric measurements will of course be proportional to the rate of flow in units of weight, and accordingly the flow meter 25 may be calibrated, or considered as calibrated, to indicate or measure the rate of flow of steam to, or through the turbine in units of weight per unit of time. The flow meter 25 may be provided with an indicator hand 26 connected through suitable linkage for example as at 27 to an adjustable contact 28 of a potentiometer 29. Inasmuch as the forces available from the indicator hands of such flow meters are generally quite small, the operating means or mechanism for adjusting the contact of the potentiometer 29 should preferably be such that it may be easily and accurately moved by and in accordance with the indicator shaft of the flow meter without interfering with the movements of the latter. Suitable forms of potentiometers and operating means for this purpose are disclosed for example in U. S. Patent to Constantine P. Xenis, Woodman Perine and Robert E. King, No. 2,273,610 granted February 17, 1942, and entitled "Electrical circuit control devices."

The potentiometer 29 may have one end connected as by a wire 30 to one side of a regulated constant voltage alternating current bus as at 31. The other end of the potentiometer may be connected to the other side of such bus through an adjustable rheostat 32. A circuit may be completed from said first end of potentiometer 29 through the primary 33 of a transformer 34, thence through a wire 35 to the adjustable contact 28 of the potentiometer. The voltage applied to said primary 33 will thus be varied in proportion with the adjustments of the potentiometer 29, which in turn will be proportional to the steam flow through the turbine in units of weight per unit of time. Thus, this varying potential may be referred to as an "electrical analogue" varying according to the rate of supply of the steam. The secondary 36 of the transformer 34 may be connected in series with two current coils as at 37 and 38 of a polyphase watt meter type of instrument indicated at 39, such connection preferably being made as shown through a rheostat 40 for properly adjusting the apparatus after it is set up, depending upon the various constants of the system. Thus the current coils 37, 38 will carry a current also varying according to the rate of supply of the steam. Hence if this current is multiplied by a voltage representing the temperature of the steam supply, the resulting varying product will provide a measure of, or "analogue" for the varying rate of heat input to the turbine. This multiplying operation may be accomplished in the watt meter instrument 39 by maintaining an "electrical analogue" for the steam temperature measurement in a potential coil 41, cooperating with the current coil 37, in the same manner that the current and voltage coils of an ordinary watt meter cooperate to multiply currents and voltages to measure and indicate power. Since the equipment of Fig. 1 is intended to indicate or measure the net heat input for the turbine and its accessories, means is also provided in the watt meter instrument to subtract the heat recovered in the feed water from the heat input to the turbine. This may be accomplished by providing a potential coil 42 in the watt meter instrument, so wound or connected as to oppose the coil 41 and cooperating with the current coil 38. That is, the coil 41 as well as the coil 42 as hereinafter explained, will both be provided with electrical "analogues," in the form of potentials respectively representing the temperatures of the steam input and of the condensate, and these in effect each are multiplied by the flow analogue, and the difference between the resulting products is the net torque on the watt meter indicating hand or pointer. Hence the instrument 39 will serve to measure, and indicate with its pointer B on a scale $b$, the difference between the rates of heat input and of the heat recovered in the condensate, thus indicating the net heat input. Such indication may for example be given in terms of "net input in B. t. u.'s per hour" on scale $b$.

For establishing the electrical analogue corresponding to the varying temperature of the steam input, an indicating thermometer as at 43 may be provided in the steam main 6. This thermometer may be accompanied by a potentiometer 44 having one end connected to the constant voltage bus as shown and having its other end connected through an adjustable rheostat as at 45 to the other side of the constant voltage bus. A variable connection as at 46 for the potentiometer 44 may be accompanied by a temperature scale as shown, and if the temperature changes are not frequent, this connection may be manually adjusted by amounts corresponding to or proportional to variations in the indications of the thermometer 43. If the temperature of the steam varies substantially or frequently, it may be desirable to effect the adjustments of the connection 46 automatically. This may be accomplished by suitable known apparatus such for example as equipment now known in the trade under the name "Micromax." It will be noted that the terminals of coil 41 of the instrument 39 are connected respectively to one side of the constant voltage bus and to the adjustable potentiometer connection 46, whereby the voltage applied to coil 41 is varied in accordance with the steam temperature variations, and thus the coil 41 receives the steam temperature "analogue" above referred to.

For establishing the electrical analogue corresponding to the varying temperature of the condensate in the pipe 19, a thermometer as at 47, a potentiometer 48, a rheostat 49, and an adjustable potentiometer contact 50, may be associated together and used in a manner like the above described corresponding parts for establishing the steam temperature analogue. But in this case, a voltage is applied to coil 42 of instrument 39, varying according to the temperature variations of the condensate in pipe 19, and thus the coil 42 receives the condensate temperature "analogue" above referred to.

It will be apparent that means is thus provided for indicating by the pointer B on scale $b$, the net heat input to the turbo-generator and associated condensing and feed heating equipment, in correlation with the adjacent indications by the pointer A and scale $a$ of the kilowatts generated. By positioning the instruments 10 and 39 so that their pointers will assume various crossed or intersecting positions as shown, throughout the useful ranges of their respective scales, a dial $c$ may be provided beneath the crossed pointers, and so arranged and calibrated as to read directly in terms of efficiency, i. e., so as to give the quotient at any time of the net input indication, divided by the power output indication. That is, the apparatus is designed to perform the following mathematical operations, immediately and concurrently with automatic measurement of the variables involved:

$$\text{Heat-rate} = \frac{k_1 T_1 q_1 - k_2 T_2 q_1}{KW} = \text{B. t. u./kw. hr.}$$

where $k_1$ and $k_2$ are constants, $T_1$ and $T_2$ represent respectively steam temperature and temperature of the feed water after leaving the last heating or condensing device. And $q_1$ represents the rate of flow of steam in units of weight per hour, which is also equivalent to the rate of flow of the condensate per hour, by weight, from the turbine auxiliary equipment.

As shown, the dial $c$ comprises a plurality of lines which may be referred to as "isoquotient" lines. A typical practical example of the dial $c$ in conjunction with scales $a$, $b$, and the cooperating crossed pointers, is shown enlarged in Fig. 2 with an illustrative set of calibrations thereon. The isoquotient line marked "30" for example, signifies that whenever the crossing point of the pointers is above any point on this line, the pointer B will be indicating a reading on scale b which, if divided by the reading of pointer A on scale a, will give a quotient of "30." Similarly for example if the crossing point is above any point along the isoquotient line marked 20, then the readings on the scales b and a respectively will be such that their quotient is "20." It will be apparent that the isoquotient lines may be drawn by connecting together several points corresponding to the crossing points of the pointers when set, at different times, to give several indications, the quotients of which are all of a predetermined value corresponding to the notation on the line being drawn.

Referring now to the arrangement of Fig. 3, a boiler, steam line, turbine and generator are shown as in Fig. 1, but in this case the steam passing from the turbine may be conducted into an exhaust steam line as at 51, by which the steam may be conducted away for heating or other secondary purposes instead of returning its condensate to the boiler as in Fig. 1. If desired, however, some of the exhaust steam may be conducted as through pipe 52 to a "feed heating turbine" as at 53. At a desired point in the feed heating turbine, some of the steam may bleed away as through pipe 54 for heating feed water for the boiler and the remaining steam exhausted from the turbine 53 may be conducted away to any suitable point as through pipe 55.

The circuits and instruments of Fig. 3 are constructed and arranged to indicate at any time the relation between the gross input in B. t. u.'s per hour to the turbine through steam main 6, in comparison with the kilowatts generated by the generator 8. That is, the equipment is designed to indicate the heat rate or "efficiency" of the turbo-generator in the sense of comparing the gross energy supplied to the turbine in the form of heat in the high pressure steam, with the electric power generated, disregarding any heat which might be recoverable from the low pressure steam going to the exhaust steam line. It is desirable to provide efficiency measurements of this type, since the low pressure steam to the exhaust line is of small value as compared with the high pressure steam to the turbine, and consequently from a practical standpoint it is of utmost importance to know the degree of efficiency with which the high pressure steam is being used for its main purpose of generating electric power, regardless of what values might be recoverable from the exhaust.

As in the case of Fig. 1, a suitable watt meter and connections as at 10' may be associated with the busses 9 for measuring and indicating with pointer A and scale a, the kilowatts generated. In case the feed heating turbine 53 is used, the scale a may be calibrated to read values of a predetermined percentage lower than the actual power output, in order to compensate for the power generated by reason of the feed heating turbine. For example, if 6% of the power for driving generator 8 is derived from the feed heating turbine and 94% from the main turbine, as in the case of one typical example, then the scale a may be calibrated to give indications 6% lower than if the auxiliary turbine were not used. Thus the watt meter readings may be made to indicate a close approximation of the power generated due to the driving force of the main turbine alone.

As in the case of Fig. 1, electrical analogues are established for the factors which determine the heat input to the turbine 7 through steam main 6, and these factors may be correlated and measured by a polyphase watt meter type of instrument as at 39'. This instrument may have a current coil 37' provided with the steam flow "analogue", this coil cooperating with a potential coil 41' carrying the steam temperature "analogue." If desired also the instrument may be provided with another set of current and potential coils 38', 42' for purposes hereinafter explained.

The steam temperature "analogue" may be applied to the coil 41' by the use of a thermometer 43', a potentiometer 44' and accompanying rheostat 45', and adjustable contact 46', all associated and connected in the same manner as the corresponding parts of Fig. 1. For the steam flow analogue, an orifice 24' may be provided in the steam line and accompanied by a steam flow meter 25' having a pointer 26' connected through linkage 27' to contact 28' of a potentiometer 29'. These parts may be associated or connected with transformer 34', rheostat 40' and current coil 37' in a manner similar to the corresponding parts of Fig. 1. However, since in this case the flow meter 25' measures or indicates the rate of flow of the steam in cubic units, it will be necessary to modify in effect the measurements of the instrument 25' in accordance with the varying steam temperatures, in order to have this instrument and its associated circuits effectively measure the steam flow in terms of units of weight. For this purpose a thermometer 56 may be mounted in the steam line 6 and connected through mechanism 57 for automatically adjusting a rheostat 59 in accordance with the steam temperature. As shown, one of the terminals of potentiometer 29' may be connected to rheostat 59, the circuit then running through adjustable rheostat contact 58, a manually set rheostat 32', and thence to one side of the regulated bus 31. The mechanism at 57 may comprise suitable known apparatus such for example as the above-mentioned "Micromax" device which will adjust the rheostat 59 by and in accordance with the steam temperature measurements. Accordingly, with the circuit and instruments as shown, the adjustments of the potentiometer 29' according to the steam flow in cubic feet, are in effect modified by the adjustments of rheostat 59 according to variations of the steam temperature, and in a manner such that the voltage applied to the primary of transformer 34', varies in accordance with the rate of steam flow in terms of units of weight per unit of time. Thus the current coil 37' of the instrument 39' receives a steam flow "analogue" varying in accordance with variations in the rate of flow of the steam in units of weight, to the turbine 7. And as in the case of Fig. 1, this analogue is multiplied by the steam temperature analogue applied to potential coil 41', whereby pointer B may indicate on scale b the input in terms of B. t. u.'s per hour, upon proper calibration of this scale. Here also as in Fig. 1, the crossed pointers A and B may cooperate with a dial c having isoquotient lines whereby direct readings of the gross heat input to turbine 7, divided by the electric power generated by the driving force of turbine 7, are given.

In case the power plant with which the apparatus of Fig. 3 is used, includes two or more turbo-generator units, then if the generators of all the units are connected to the busses 9, additional steam flow and temperature analogues respectively may be applied to watt meter coils such as at 38', 42' of instrument 39'. In this case potential coils 41' and 42' may be so wound or connected that the instrument will add the products of the steam flow and temperature analogues for each turbine. While but two sets of coils are indicated for the instrument 39', to enable the steam input to be measured for two turbines, it will be understood that a number of additional sets of coils corresponding to the number of turbines in the plant, may be included in the same instrument and provided with means for supplying the corresponding analogues thereto in the same way as shown in Fig. 3 for coils 37' and 41'. Thus the net torque on pointer B may be used to indicate the total input in B. t. u.'s to all the turbines of the plant and such indication being so given in correlation with the indications of pointer A as to indicate the varying quotient on dial c of the total gross input in B. t. u.'s per hour to the turbines of the plant, divided by the total kilowatts generated by all the generators connected to said turbines and to power busses 9.

It will further be understood that in case the equipment of Fig. 1 is to be used to indicate the efficiency of a group of turbo-generator units in a power plant, then additional current and potential coils connected with their proper measuring instruments and circuits, for each of the units respectively, may be incorporated in the polyphase type of watt meter instrument 39, in a manner similar to that above explained in connection with instrument 39' of Fig. 3. In that case the output watt meter 10 will be connected to measure the total watts generated by the several units, and the pointer A in conjunction with the pointer B will indicate a comparison of the kilowatts generated and the net input in B. t. u.'s for all the turbo-generator units collectively.

Where the several turbo-generator units of a plant are all the same or similar in construction, it has been found that the same temperature analogue or analogues (as made available in the form of potentials applied to coils 41, 42 in Fig. 1, or to coil 41' in Fig. 3) may be used for all the turbo-generator units without introducing inaccuracies of greater than one-half of one percent, for example, in the readings given by the pointer B. That is, the steam and condensate temperature measuring devices and circuits need be applied to but one of the like turbo-generator units, and the resulting analogues need be applied to but one set of watt meter potential coils as at 41, 42 in Fig. 1. Then this single set of potential coils may be used in the watt meter in conjunction with several sets of current coils as at 37, 38, carrying respectively the flow analogues for the several turbo-generator units. Similarly, with the arrangement of Fig. 3 the equipment for establishing a single temperature analogue, and a single potential coil as at 41' may be used in conjunction with a plurality of current coils as at 37' carrying the flow analogues respectively for the several like turbine units of the plant. This expedient will simplify to a considerable extent and reduce the cost of the efficiency indicating apparatus when applied to a group of turbine units.

The principles according to which the various circuit constants of the above described apparatus may be selected, together with the preferred mode in which these principles may be applied, and the equipment adjusted and calibrated, will now be explained. In establishing the above described electrical "analogues," the first requirement is to secure a constant voltage source from a suitable regulator. For the particular examples above described, a constant voltage of 115 volts at 60 cycles was selected and applied from a suitable known type of regulator to the busses 31. The voltage magnitude chosen fixes in general the maximum voltage available in the various circuits, which is then subdivided and apportioned by the several resistors and potentiometers. The flow meter or current circuit may be treated as a starting point in the design, with constants depending upon the particular watt meters (39 or 39') to be used. If for example 5 amperes be taken as a reasonable maximum current for these instruments, then the circuit may be designed so that for maximum steam flow, 5 amperes will be circulated. Neglecting steam pressure with the present examples of the invention (for the reasons above explained), this condition may be obtained when the flow meter is at maximum deflection and the steam temperature at the same time is at its operating minimum (maximum steam density). For this condition all the supply voltage would appear across the flow meter potentiometer and its output voltage would be at a maximum and equal to that of the supply voltage. The ratio between the flow meter potentiometer resistance (as at 29') and its temperature-correcting resistance (59), where one is used as in Fig. 3, is next fixed so that the current from the combined circuit of the two resistances can be increased and decreased precisely as the flow meter density factor increases and decreases with steam temperature changes. When this ratio has been fixed, it then remains to assign the absolute values of resistance, but these in practice depend upon other factors as follows: The watt meter instrument current circuits are inherently of low impedance requiring only a small voltage for the circulation of 5 amperes, and moreover, potentiometer windings and contacts designed to carry 5 amperes, are generally impractical in equipment of this class. Hence a transformer (as at 34 or 34') is preferably used which will circulate 5 amperes in the secondary or instrument circuit when voltages of the order of 115 volts are impressed on its primary from the potentiometer. A resulting small current then flows in the primary. In order to preserve the linearity of response of the potentiometer, the load current must be small compared with the normal or nonload current through the potentiometer itself. We have found that a ratio of 1 to 10 is satisfactory and therefore the absolute values of the resistances (such as at 29 and 32 in Fig. 1, 29', 59 and 32' in Fig. 3) may be so assigned that for the given supply voltage, the ratio of load current to potentiometer current will be of this order.

In designing the steam temperature potentiometer and the associated potential circuits, the supply voltage magnitude is taken as one point of reference. That is, since the B. t. u.'s per pound of the steam (for substantially constant pressure) vary substantially with the temperature, and since voltage has been chosen to represent temperature and thus B. t. u.'s per pound of steam, this potentiometer is arranged to transmit maximum voltage when the steam temperature is at its operating maximum (maximum B. t. u.'s per pound, heat content), and lesser voltages for lower temperatures in proportion. The ratios of the various parts of the potentiometer and absolute values of resistance are fixed by the operating steam temperature range and by the magnitude of the current drawn by the watt meter instrument potential circuits.

With the steam flow and steam temperature circuits designed, the effect has been to establish in the analogue system a relation of B. t. u.'s per pound per volt. To design the feed water potentiometer circuit, it is now only necessary to know the operating range of water temperatures and thus the operating range of B. t. u.'s per pound of water, and we then have the voltage range for the circuit of this potentiometer. With the particular example of Fig. 1, these voltages were found to be of the order of one-fourth of those for the steam temperature circuits. Hence rather than operate the potential coil of the watt meter at low voltages, the associated current coil or coils of the watt meter (as at 38) may be adjusted to have one-fourth the number of turns of the current coil or coils 37 associated with the steam temperature element of the watt meter. This permits full voltage excitation of the potential coils with consequent preservation of meter accuracy, and yet producing the desired one-fourth torque.

After selecting or designing the potentiometers in accordance with the above principles, the circuits may conveniently be set up in a laboratory in conjunction with the particular transformer (34, 34') and the particular type of watt meter (39, 39') chosen. Due to various unpredictable factors as to the details of construction and operation of the potentiometers or the connections therefor, they may not deliver voltages which will accurately agree at various settings with those calculated. Accordingly it is advisable to accompany each of the potentiometers with the manually adjustable rheostats (as at 32, 45 and 49, Fig. 1, and 32', 45', Fig. 2), whereby the current to these potentiometers after being set up in the manner intended for use, may be so adjusted that the potentiometers will deliver the desired voltages. Similarly because of the unpredictable factors in the transformers (34, 34') and their connections, or the watt meter current coils (as at 37, 38, 37'), the current in the latter may not accurately correspond to that intended or calculated, and accordingly the circuit of these coils may be provided with a manually adjustable resistance as at 40, 40', to compensate for the error to which the current would otherwise be subject.

With the circuits set up as above explained, the scale b may be readily calibrated, either in the laboratory or after installation in the power plant, by arbitrarily applying in succession several different sets of adjustments to the potentiometers, representing various particular flow and temperature values. For each set of such values, the "net input in B. t. u.'s" may be calculated and a corresponding notation placed at the point on scale b where the pointer B comes to rest with the potentiometers adjusted at the values used for the calculation. Since the divisions along scale b are substantially equal, the whole scale may generally be calibrated and safely checked upon making three or four sets of adjustments of the potentiometers, and comparing the calculated reading with the actual reading in each case.

The use of a regulated constant voltage source of alternating current form has the advantage, as disclosed in another application, that where the system is used with a steam supply of varying pressure, then such varying pressure may be used to vary the power factor as between the voltage and current coils in the watt meters 39, 39', and thereby correct the net input B. t. u. reading according to the varying steam pressure. In connection with the particular examples above described, it should be noted that the final phase position of the current and voltage vectors at the watt meters should be held fixed and preferably in phase, as will occur if the reactance and capacity factors of the voltage and current circuits respectively do not differ greatly. Any difficulties encountered in this respect may ordinarily be overcome by trial adjustments of the various manually adjustable resistances.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Method of indicating efficiency of heated fluid-driven electric power generating equipment which comprises, continuously maintaining an electric analogue varying in direct proportion to the rate of supply by weight of the fluid through the equipment, continuously maintaining two other electrical analogues varying respectively substantially in direct proportion to varying temperatures of the fluid entering and leaving the equipment, utilizing said analogues to continuously maintain a magnetic field varying according to the varying product of said fluid supply analogue and the difference of said temperature analogues, to thereby provide a running measure of the rate of net heat input, continuously measuring the electric power output of the equipment, and continuously indicating such output and input measurements in such correlation to each other, as to display the varying quotient of such output and input measurements.

2. Method of indicating efficiency of steam-driven electric generating equipment which comprises, the step of continuously maintaining an electrical analogue for the rate of supply of steam for driving the equipment, including in such step the control of said analogue in accordance with temperature changes of the steam to thereby vary said analogue substantially in direct proportion to the rate of supply in pounds per unit of time, continuously maintaining another electrical analogue variable substantially in proportion with variations of such temperatures, utilizing said analogues to continuously maintain a magnetic field varying according to the product of said analogues, to thereby provide a running measure of the rate of heat input, continuously measuring the electric power output of the equipment, and correlating said measurements to display quotients of the varying output and input measurements.

3. Method of indicating efficiency of steam-driven electrical power generating equipment comprising, the step of continuously maintaining an electrical analogue substantially directly proportional to the rate of supply by weight of the steam to the equipment, continuously maintaining another electrical analogue substantially proportional to the heat energy available per unit of such steam supply, utilizing said analogues to continuously maintain a magnetic field varying according to the product of said analogues, to thereby provide a running measure of the rate of energy input, continuously measuring the electric power output of the equipment, and displaying a comparison of said varying output and input measurements.

4. Apparatus for measuring varying rates of heat supply in steam flowing to equipment which utilizes and condenses the steam, and where the ranges of the variations in the steam pressure and temperature are such that the heat content per unit of weight of the steam varies substantially in direct proportion to the steam temperature, comprising a flow meter connected to measure the rate of flow of the condensate of the steam supply after its passage through the equipment, an electric circuit with control means adjustable by actuations of said flow meter to thereby provide an electrical analogue varying substantially in accordance with variations by weight, of the steam flow to the equipment, another electric circuit with control means adjustable in accordance with the varying temperatures of the steam supply to provide an electrical analogue for the steam supply temperatures, a circuit and control means therefor for providing a further electrical analogue representing condensate temperature, and an electrical measuring instrument operatively connected to said circuits to measure the varying product of said first named analogue and the difference of the last two named analogues.

5. Apparatus for indicating efficiency of electrical power generating equipment driven by vapor of varying available energy content, comprising in combination, an electric circuit with control means for establishing in the circuit an electrical analogue varying substantially in direct proportion with the rate of supply by weight of the vapor to the equipment, other electric circuit means with control devices for establishing another electrical analogue varying substantially in proportion with the energy available per unit of such vapor supply, electromagnetic instrument means constructed and arranged in association with said circuits for measuring the product of said analogues to thereby provide a measure of the rate of energy input, and associated means for concurrently measuring the electric power output of the equipment and given indications in correlation with the input measurements to display quotients of the output and input measurements.

6. Apparatus for indicating the efficiency of a plurality of electrical power generating units driven respectively by independent supplies of vapor of varying available energy content, comprising electrical circuits with control means for maintaining variable electrical factors substantially proportional respectively to the varying rates of supply of the vapor for driving each unit, electrical circuits with control means for maintaining other variable electrical factors substantially proportional respectively to the varying amounts of energy available per unit of quantity of such vapor for each generating unit, polyphase watt meter type of instrument means constructed and arranged in association with said circuits for providing a measure of the sum of the products of said first-named and second-named factors for each generating unit to thereby provide a measure of the total energy input, and instrument means constructed and arranged to provide a measure of the electric power output of said plurality of generating units in conjunction with the total input measurement, to display quotients of such output and input measurements.

CONSTANTINE P. XENIS.
LESTER J. PARSONS.
WOODMAN PERINE.
ROBERT E. KING.
HAROLD A. BAUMAN.